(12) United States Patent
Martin (10) Patent No.: US 7,975,629 B1
(45) Date of Patent: Jul. 12, 2011

(54) CLOSING WHEEL ASSEMBLY (76) Inventor: Ronald S. Martin, Elkton, KY (US)

( * ) Notice: Subject to any disclaimer, the term of this patent is extended or adjusted under 35 U.S.C. 154(b) by 0 days.

(21) Appl. No.: 12/480,656

(22) Filed: Jun. 8, 2009

Related U.S. Application Data

(60) Provisional application No. 61/131,182, filed on Jun. 6, 2008.

(51) Int. Cl.
*A01B 15/16* (2006.01)
*A01B 49/04* (2006.01)
*A01C 5/00* (2006.01)
*A01C 7/08* (2006.01)
*A01C 7/18* (2006.01)

(52) U.S. Cl. .......... 111/52; 111/140; 111/163; 111/193; 172/604

(58) Field of Classification Search ............ 111/52, 111/62, 85, 139, 140, 143, 144, 147, 149–162, 111/163, 190–196; 172/624.5, 604
See application file for complete search history.

(56) References Cited

U.S. PATENT DOCUMENTS

| | | | | |
|---|---|---|---|---|
| 4,307,674 A * | 12/1981 | Jennings et al. | ............... | 111/164 |
| 4,374,500 A * | 2/1983 | Westerfield | ................... | 111/164 |
| 5,497,717 A | 3/1996 | Martin | | |
| 5,619,939 A * | 4/1997 | Herman et al. | ............... | 111/163 |
| 5,676,073 A | 10/1997 | Bergland et al. | | |
| 6,135,037 A * | 10/2000 | Juptner | .......................... | 111/139 |
| 6,530,334 B2 | 3/2003 | Hagny | | |
| 7,152,541 B2 * | 12/2006 | Ptacek | ............................ | 111/185 |
| 2002/0100401 A1 * | 8/2002 | Lempriere | ..................... | 111/178 |

* cited by examiner

*Primary Examiner* — Christopher J. Novosad
(74) *Attorney, Agent, or Firm* — Hamilton IP Law, PC; Jay R. Hamilton; Charles A. Damschen (57) ABSTRACT

A closing wheel assembly having a closing wheel frame and at least one closing wheel pivotally mounted to a lever allows the operator to change the angle at which the at least one closing wheel intersects the ground surface during use. The lever to which the closing wheel is mounted may be pivotally mounted to the closing wheel frame about a lever attachment. The lever may be formed with a lever handle on a first end thereof and a closing wheel mount on the second end thereof, wherein the lever attachment is positioned between the first and second ends of the lever. Accordingly, as the angle of the lever is manipulated about the lever attachment, the angle of the closing wheel pivotally mounted to that lever changes in the vertical and/or horizontal dimensions.

15 Claims, 14 Drawing Sheets

CLOSING WHEEL ASSEMBLY

CROSS REFERENCE TO RELATED APPLICATIONS

This application claims the filing benefit under 35 U.S.C. §119(e) of provisional U.S. Patent Application Ser. No. 61/131,182 filed on Jun. 6, 2008, which is incorporated by reference herein in its entirety.

FIELD OF THE INVENTION

The methods and apparatuses described herein are generally applicable to the field of agricultural equipment. The embodiments shown and described herein are more particularly for improved closing wheel assemblies.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

U.S. Pat. No. 5,676,073 assigned to Deere & Company entitled "Closing Wheels Adjustment Mechanism" is relevant prior art and incorporated by reference herein. U.S. Pat. No. 5,497,717 issued to H. Martin entitled "Furrow Closing Device" is also relevant prior art and incorporated by reference herein.

SUMMARY OF INVENTION

A closing wheel assembly to adjust the orientation of closing wheels with respect to the furrow is disclosed herein. In a first embodiment, the closing wheel assembly may be retrofitted to existing closing wheel frames. In a second embodiment, the closing wheel assembly includes a novel closing wheel frame.

The closing wheel assembly consists of an angle lever that is pivotally mounted to the closing wheel frame. One end of the angle lever forms a handle and the opposite end attaches to a closing wheel. Angle notches are provided to secure the angle lever in a desired position, which consequently secures the closing wheel attached to that angle lever in a desired orientation. If the closing wheel is angled with respect to the furrow in either the vertical or horizontal planes, adjusting the angle lever may compensate for orientation changes in the closing wheel due to changes in penetration depth of the closing wheel.

The closing wheel assembly may be used with paired closing wheels, wherein each planter row unit includes two closing wheels, or it may be used with single closing wheels, wherein each planter row unit includes one closing wheel.

BRIEF DESCRIPTION OF FIGURES

In order that the advantages of the cleaning wheel will be readily understood, a more particular description of the cleaning wheel briefly described above will be rendered by reference to specific embodiments illustrated in the appended drawings. Understanding that these drawings depict only typical embodiments of the cleaning wheel and are not therefore to be considered limited of its scope, the cleaning wheel will be described and explained with additional specificity and detail through the use of the accompanying drawings.

| DETAILED DESCRIPTION - LISTING OF ELEMENTS | |
|---|---|
| Element Description | Element Number |
| Closing wheel assembly | 10 |
| Aperture | 12 |
| Planter row unit | 20 |
| Tool bar | 21 |
| Furrow opener | 22 |
| Depth regulator | 23 |
| Seed delivery mechanism | 24 |
| Container | 25 |
| Linkage | 26 |
| Row unit frame | 27 |
| Closing wheel frame | 30 |
| Lever notch | 32 |
| Lever notch bracket | 34 |
| Closing wheel frame pivot | 36 |
| Closing wheel depth adjuster | 38 |
| Lever | 40 |
| Lever attachment | 42 |
| Lever handle | 44 |
| Closing wheel mount | 46 |
| Closing Wheel | 50 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1:
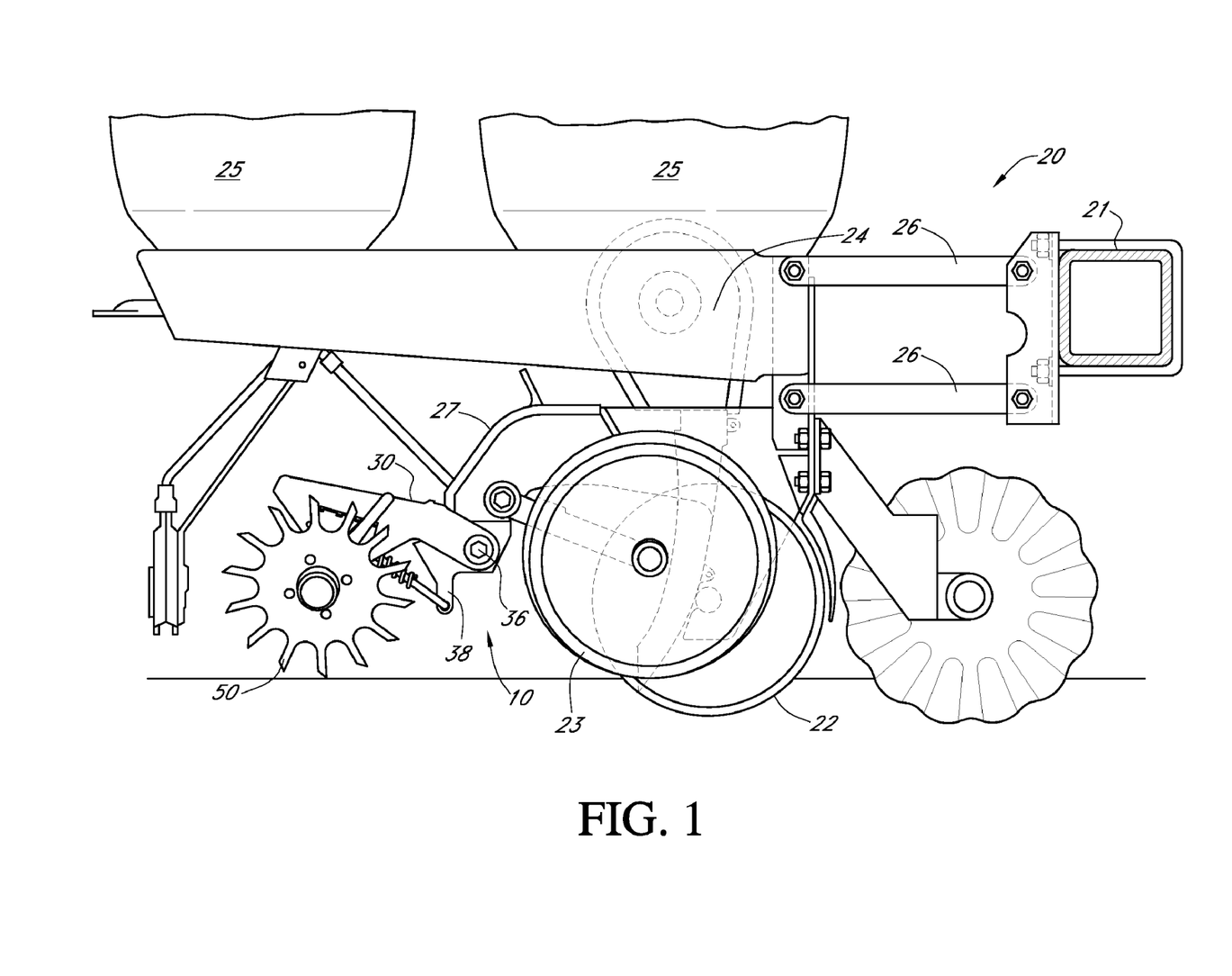
FIG. 1 illustrates a planter row unit incorporating a first embodiment of the closing wheel assembly.

Referring now to the drawings, wherein like reference numerals designate identical or corresponding parts throughout the several views, FIG. 1 provides a side view of a prior art planter row unit 20 incorporating a first embodiment of the closing wheel assembly 10. Planter row units 20 of the type depicted in FIG. 1 are generally mounted to a tool bar 21 or similar structure using linkage 26, which may be oriented in a parallel fashion, as shown in FIG. 1, or which may be non-parallel. The planter row unit 20 generally includes a furrow opener 22 to open a furrow in the ground surface, a down pressure member (not shown) for applying a biasing force to the furrow opener 22, a depth regulator 23 for regulating the depth of the furrow, a seed delivery mechanism 24 for delivering seed to the opened furrow, a closing wheel assembly 10 for closing the furrow, at least one container 25 for holding seed or fertilizer, and a row unit frame 27 to which various elements of the planter row unit 20 are mounted.

As those practiced in the art will appreciate, the closing wheel assembly 10 shown in FIG. 1 allows the operator to adjust the relative vertical position closing wheel assembly 10 (and consequently the vertical position of the closing wheels 50) with respect to the row unit frame 27, thereby adjusting the penetration depth of the closing wheels 50 into the ground surface. The apparatus designed to allow this vertical adjustment is disclosed in U.S. Pat. No. 5,676,073, which is incorporated by reference herein in its entirety. In this design, the closing wheel frame 30 is mounted to the row unit frame 27 at the closing wheel frame pivot 36. In this way, the closing wheel frame 30 is pivotal with respect to the row unit frame 27 about the closing wheel frame pivot 36, which is well known to those skilled in the art. The closing wheel depth adjuster 38 varies from one planter row unit to the next in structure, but generally operates to adjust the position of the closing wheel frame 30 about the closing wheel frame pivot. In the embodiment shown in FIG. 1, the closing wheel depth adjuster 38 consists at least of an arm, spring, and lever, and will not be described further herein for reasons of clarity.

The closing wheels 50 may be angled with respect to the horizontal and/or vertical planes. The ideal orientation of the closing wheels 50 will depend on the type of planter, the type of planter row unit 20, the type of closing wheels 50, the soil conditions, the type of seed planted, and operator preferences. In the first embodiment of the closing wheel assembly shown in FIGS. 1-4, the closing wheels 50 are angled with respect to the vertical plane only, which is typical for a spiked closing wheel 50, such as that shown, in certain applications. The embodiment of the closing wheels 50 shown in FIGS. 1-6 works well in many conditions when each closing wheel 50 is angled twenty three degrees from the vertical. The angle at which the closing wheels 50 engage the ground surface when oriented as shown in FIG. 3A is substantially parallel to the furrow, but it may be orientated as depicted in FIGS. 7B and 7C, and the optimal orientation of the closing wheels 50 depend on many factors as indicated above.

Figure 6:
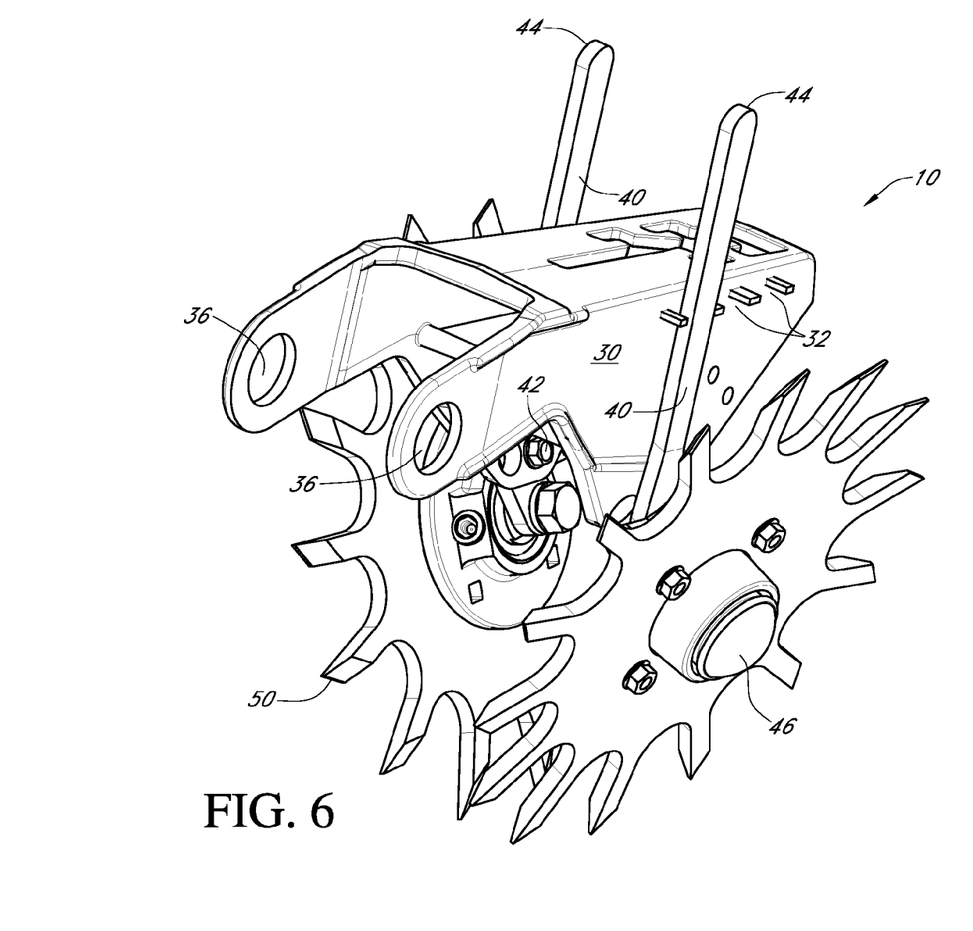
FIG. 6 provides a perspective view of the second embodiment of the closing wheel assembly.
Figure 7A:
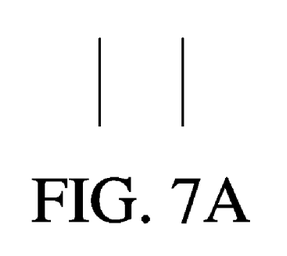
FIG. 7A depicts the angle at which the closing wheels intersect the ground surface when set for deepest penetration.
Figure 7B:
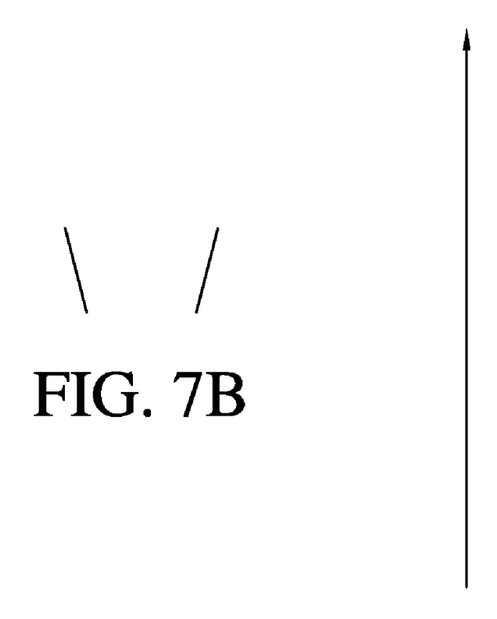
FIG. 7B depicts the angle at which the closing wheels intersect the ground surface when set for intermediate penetration without changing the position of the levers to account for the different angle of the closing wheel frame.
Figure 7C:
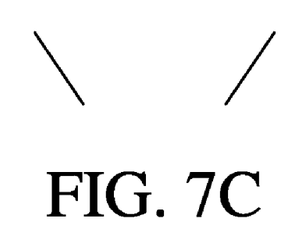
FIG. 7C depicts the angle at which the closing wheels intersect the ground surface when set for the shallowest penetration without changing the position of the levers to account for the different angle of the closing wheel frame.

In FIGS. 7A-7C, the direction of travel of the planter row unit 20 is indicated by the arrow. When the penetration depth of the closing wheels 50 is adjusted by changing the angle of the closing wheel frame 30 with respect to the row unit frame 27 about the closing wheel frame pivot 36, the angle of the closing wheels 50 with respect to the furrow changes. For example, if the closing wheels 50 are angled with respect to the vertical plane, as their penetration depth is reduced, the angle at which the closing wheels 16 contact the ground surface may become more aggressive (i.e., the angle of the closing wheels 50 relative to the direction of travel may become greater), which is shown in the progression of FIGS. 7A-7C. FIG. 7A shows a typical angle at which the closing wheels 50 intersect the ground surface for certain applications, which angle corresponds to approximately one inch penetration of the closing wheels 50 into the ground surface. Spiked closing wheels 50, such as those pictured in FIGS. 1-6, require less of an angle with respect to the direction of travel to fill the furrow due to the aggressive teeth. By contrast, smooth closing wheels 50 generally require a greater angle to adequately fill the furrow.

When the closing wheels 50 are moved from a deeper penetration setting to a lower penetration setting (i.e., pivoting the closing wheel frame 30 toward the ground surface about the closing wheel frame pivot 36) without making other adjustments to the orientation of the closing wheels 50, the angle at which each closing wheel 50 engages the ground surface follows the progression shown in FIGS. 7A-7C, which is exaggerated for illustrative purposes. As explained in detail below, the closing wheel assembly 10 disclosed herein allows the user to keep the angle at which the closing wheels 50 engage the ground surface substantially constant as the penetration depth of the closing wheels 50 is varied.

In addition to the angle at which the closing wheels 50 engage the ground surface with respect to the furrow (i.e., the direction of travel), the spacing between the respective ground engagement portions of the closing wheels 50 of a pair of closing wheels 50 mounted on a single closing wheel assembly 10 affects the amount of material the closing wheels 50 move toward the furrow. As may be seen in FIG. 3A, the closing wheels 50 are separated by the shortest distance at their respective bottom portions, which is the portion of the closing wheel 34 that primarily engages the ground surface. When the closing wheel frame 30 is adjusted so that the closing wheels 50 penetrate the ground surface to a shallower depth (typically by moving the closing wheel frame 30 away from the ground surface by pivoting the closing wheel frame 30 upward about the closing wheel frame pivot 36), which is shown from a rearward vantage in FIG. 3B, the distance between the portions of the closing wheels 34 that engage the ground surface is increased. As explained in detail below, the closing wheel assembly 10 disclosed herein allows the user to keep the distance between the ground engagement portions of paired closing wheels 50 substantially constant as the penetration depth is varied. The closing wheel assembly 10 is again shown from a rearward vantage in FIG. 3C, wherein the orientation of the closing wheels 50 has been adjusted to compensate for the change in penetration depth (i.e., angle of the closing wheel frame 30 with respect to the ground surface) so that the angle at which the closing wheels 50 intersect the ground surface is similar to that shown in FIG. 3A.

Figure 3A:
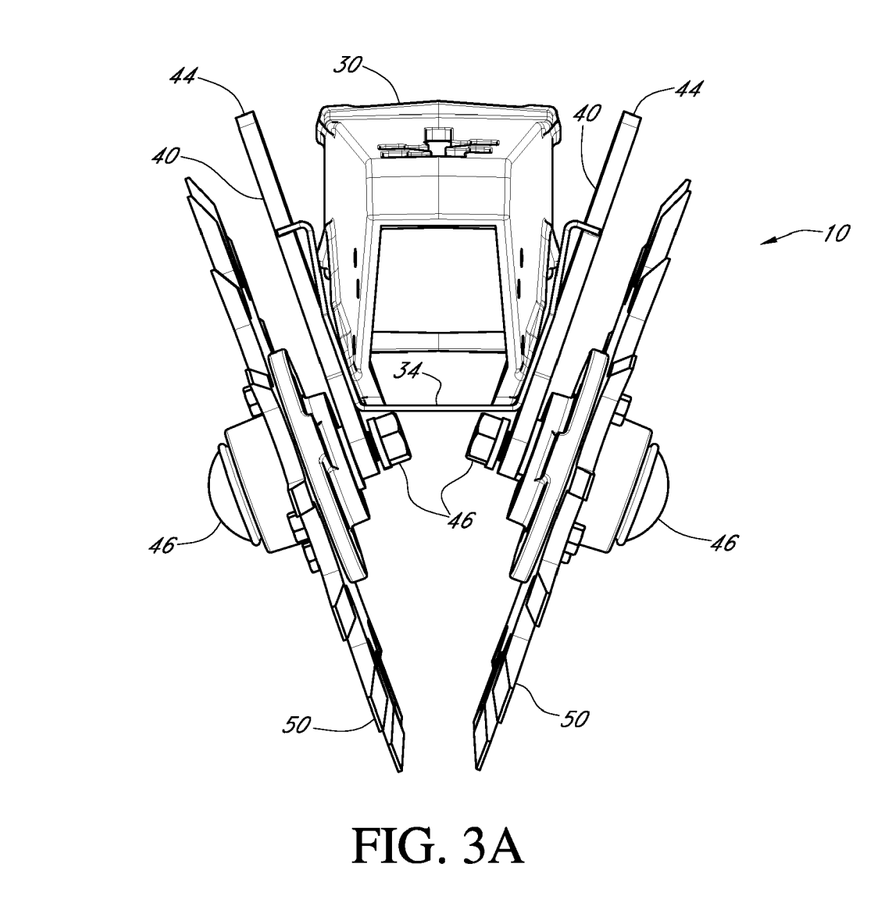
FIG. 3A provides a rear view of one embodiment of the closing wheel assembly wherein the closing wheels are positioned at a first extreme of adjustment with the lever toward the front of the planter row unit.
Figure 3B:
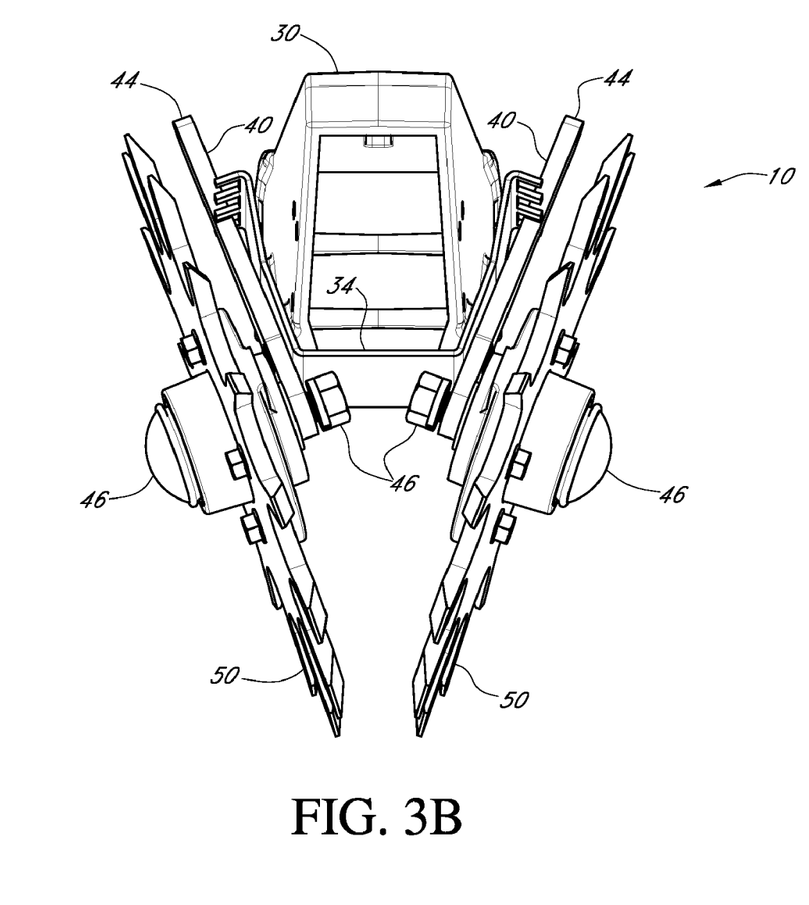
FIG. 3B provides a rear view of one embodiment of the closing wheel assembly wherein the angle of the closing wheel frame has changed from that shown in FIG. 3A so that the closing wheels penetrate the ground surface by a lesser amount than as shown in FIG. 3A.
Figure 3C:
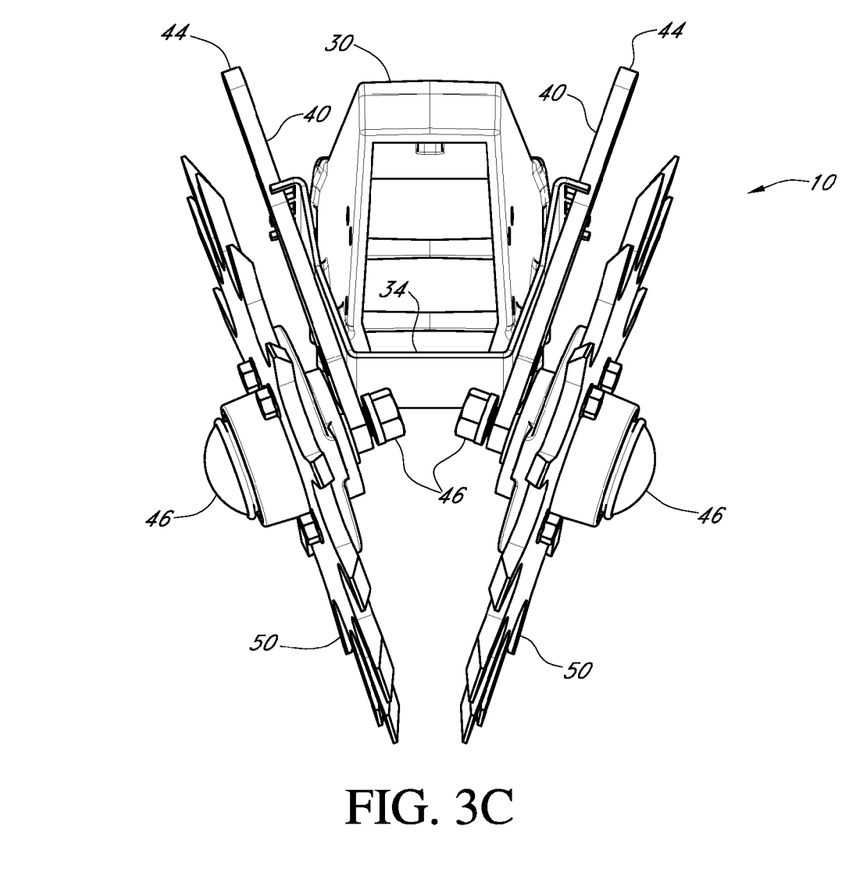
FIG. 3C provides a rear view of one embodiment of the closing wheel assembly wherein the angle of the closing wheel frame is the same as that as shown in FIG. 3B but with the levers positioned differently than shown in FIG. 3B.
Figure 3D:
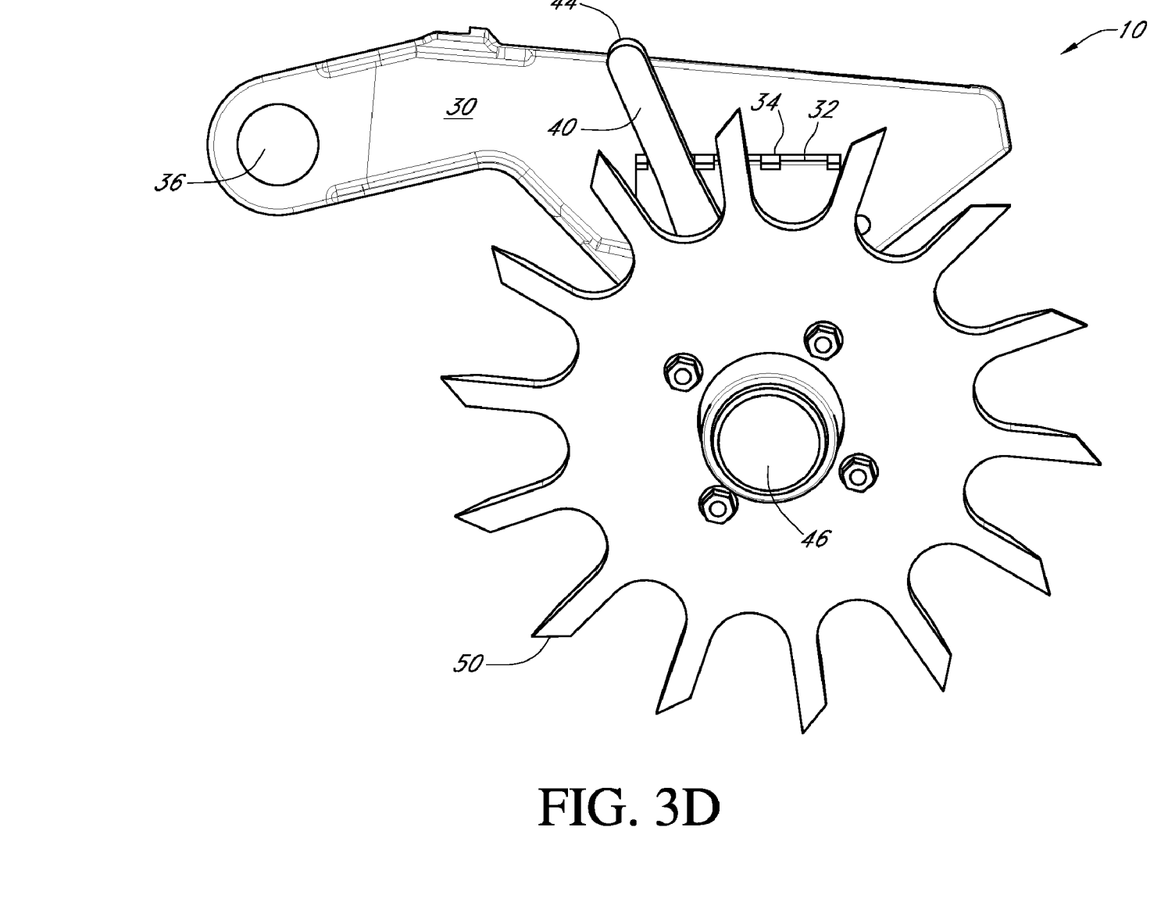
FIG. 3D provides a side view of one embodiment of the closing wheel assembly as configured and oriented as shown in FIG. 3A.
Figure 3E:
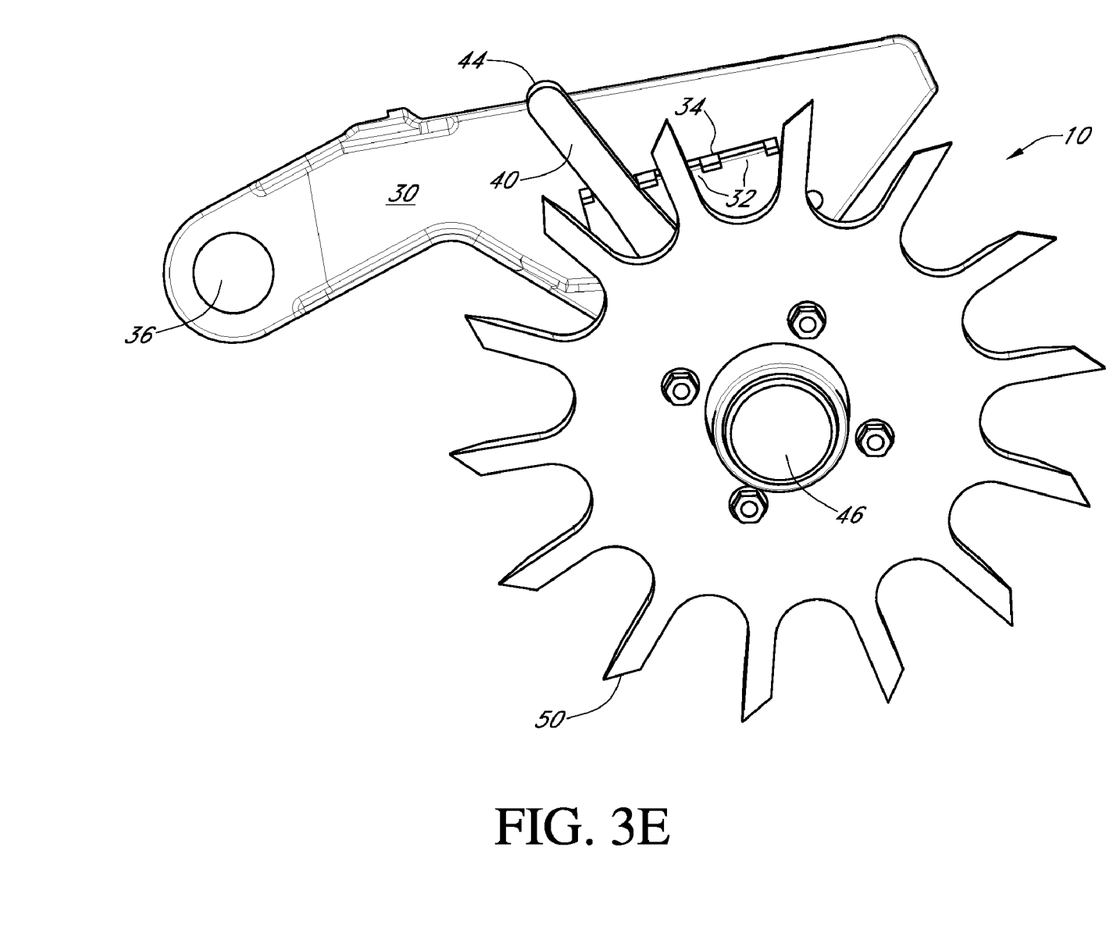
FIG. 3E provides a side view of one embodiment of the closing wheel assembly as configured and oriented as shown in FIG. 3B.
Figure 3F:
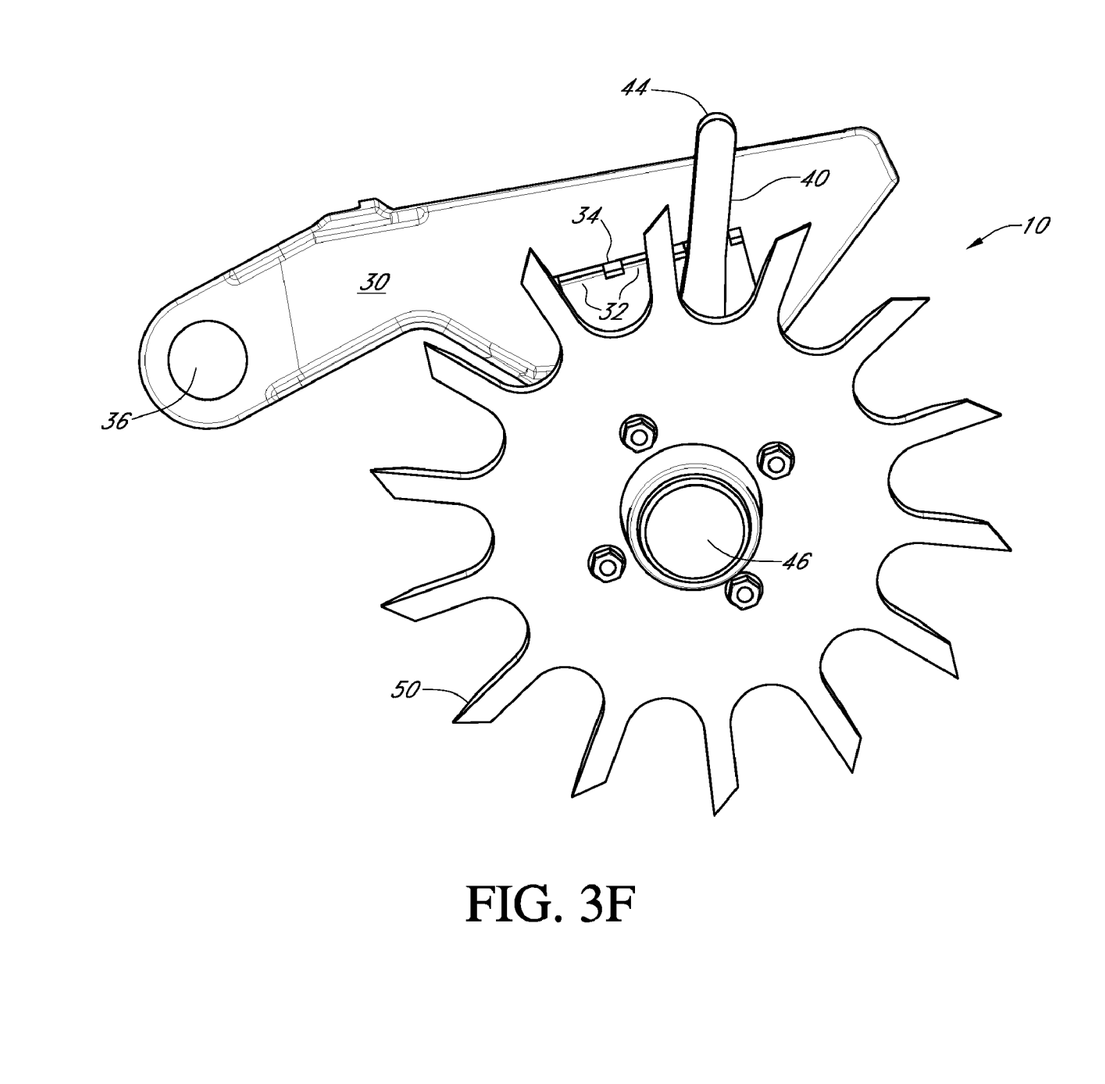
FIG. 3F provides a side view of one embodiment of the closing wheel assembly as configured and oriented as shown in FIG. 3C.
Figure 3G:
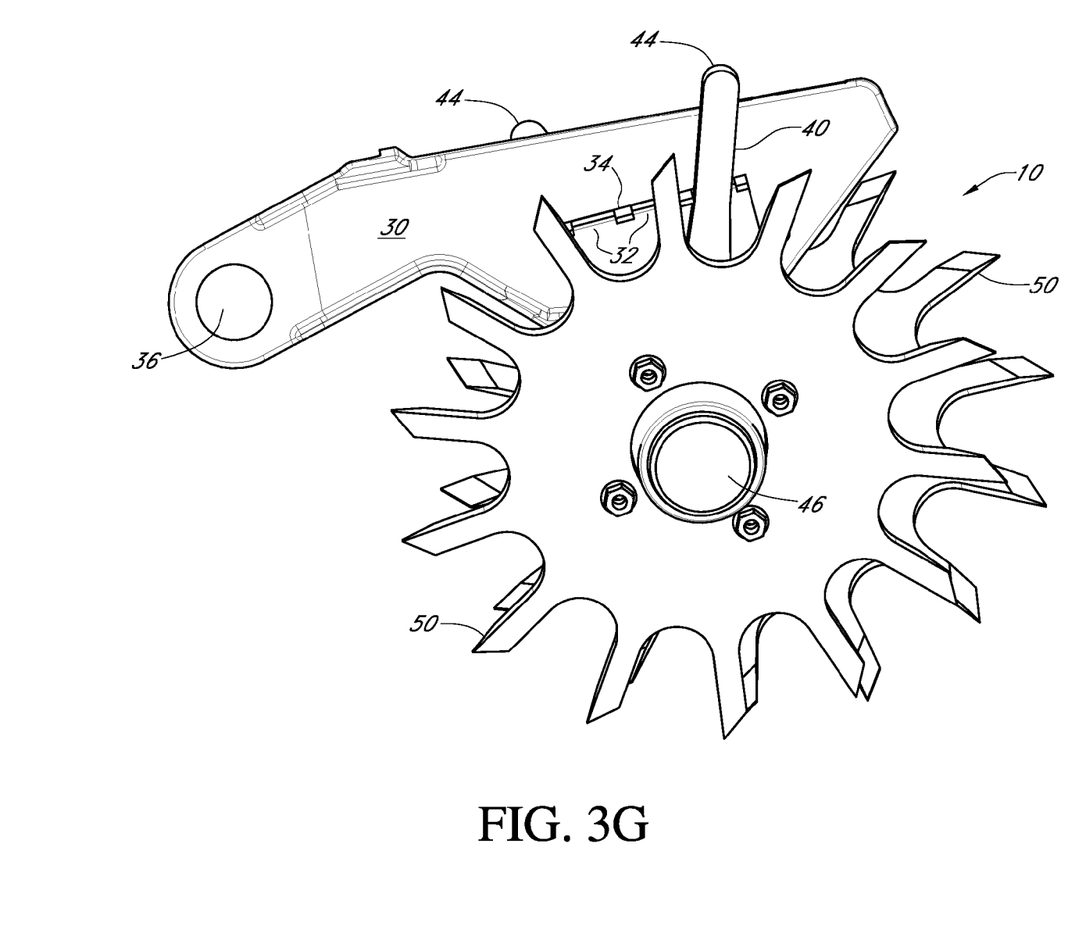
FIG. 3G provides a side view of one embodiment of the closing wheel assembly wherein one closing wheel is positioned at a first extreme of adjustment and the other closing wheel is positioned at a second extreme of adjustment.
Figure 4A:
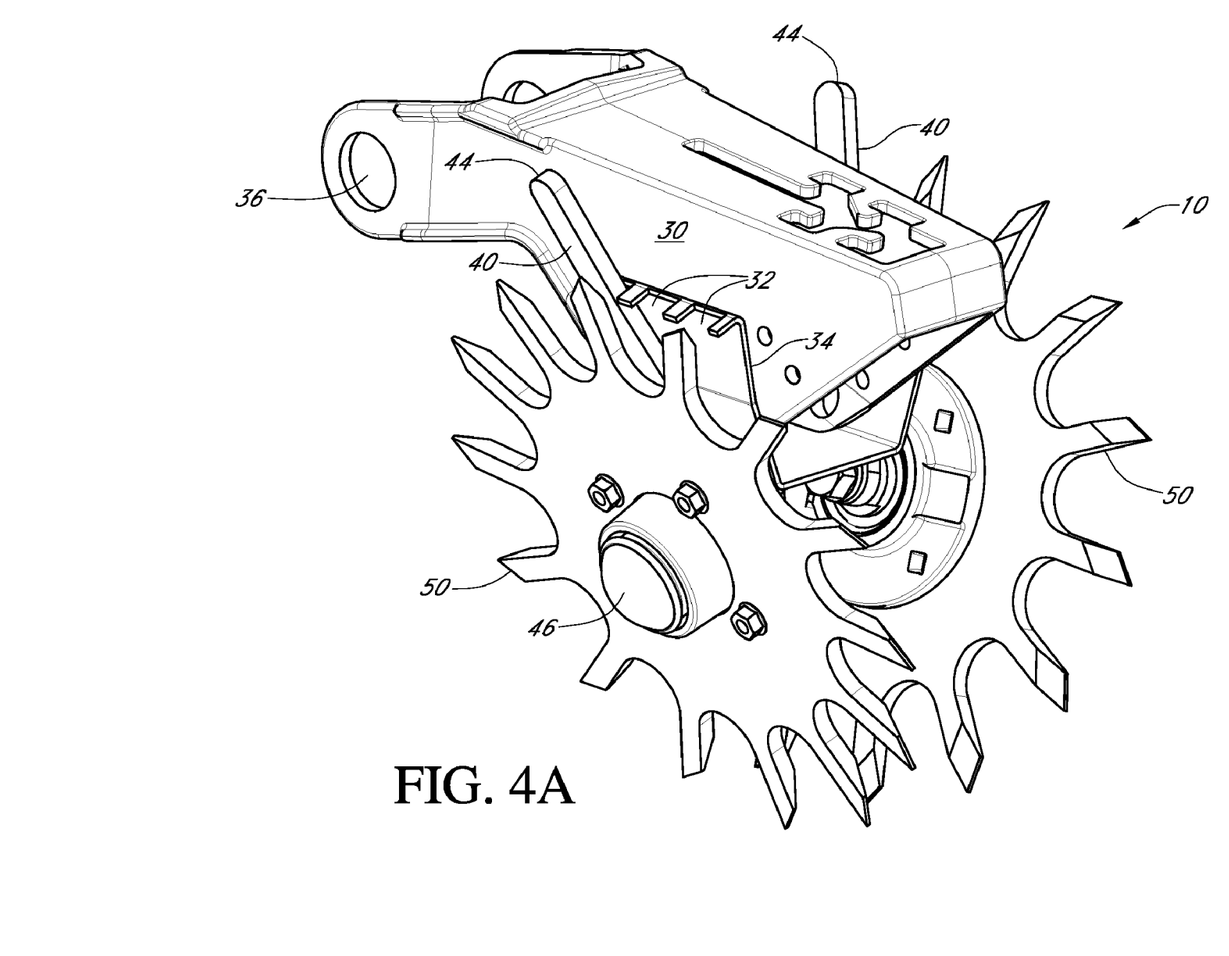
FIG. 4A provides a perspective view of one embodiment of the closing wheel assembly wherein the closing wheels are positioned at a first extreme of adjustment with the lever toward the front of the planter row unit.
Figure 4B:
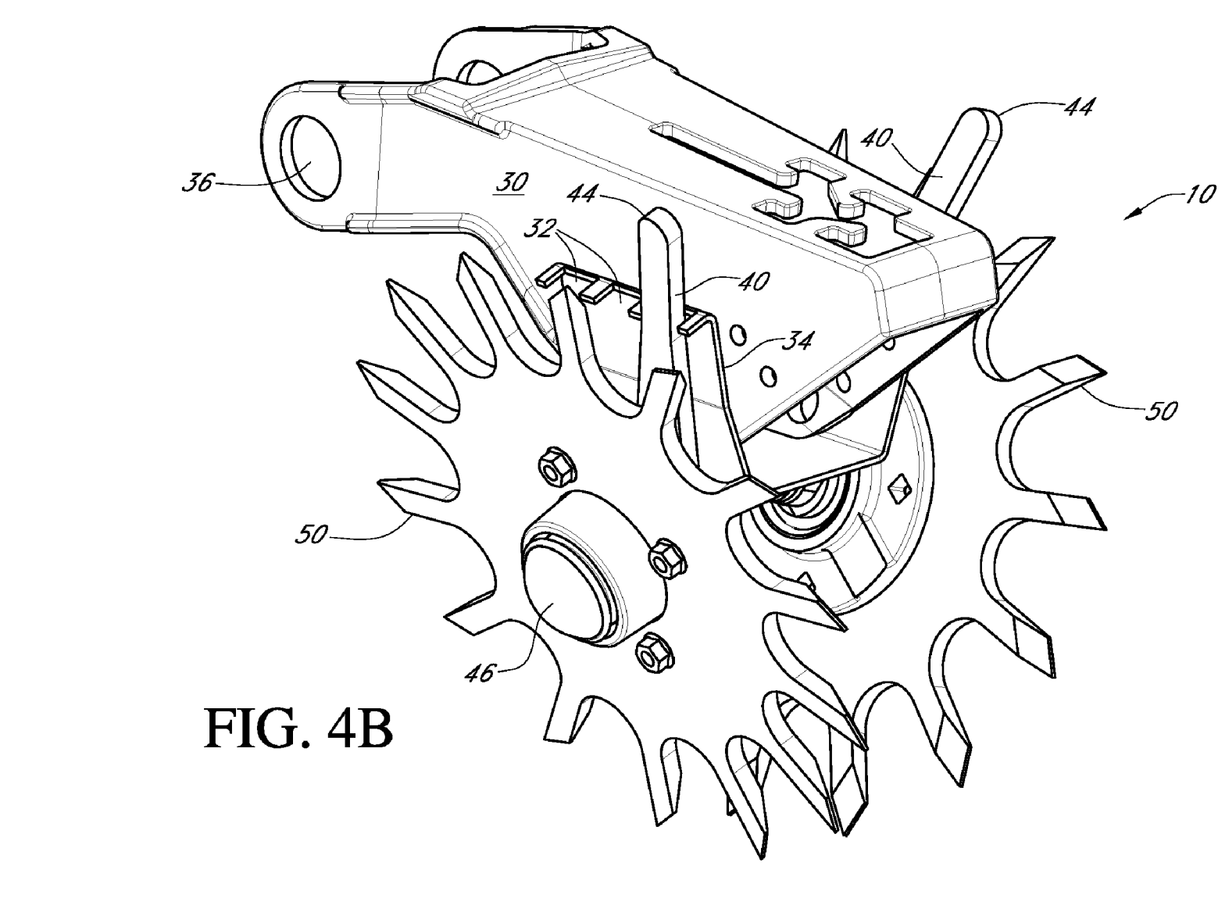
FIG. 4B provides a perspective view of one embodiment of the closing wheel assembly wherein the closing wheels are positioned at a second extreme of adjustment with the lever toward the rear of the planter row unit.

These various orientations/configurations of the closing wheel assembly 10 are shown from the side in FIGS. 3D-3F. That is, in FIG. 3D the closing wheel frame 30 is angled with respect to the row unit frame 27 by the same amount as shown in FIG. 3A, and the levers 40 are in the same lever notches 32 in FIGS. 3A and 3D. In FIG. 3E the closing wheel frame 30 is angled with respect to the row unit frame 27 by the same amount as shown in FIG. 3B, and the levers 40 are in the same lever notches 32 in FIGS. 3B and 3E. Finally, FIGS. 3C and 3F correspond to one another in the same manner. In FIG. 3G, the lever 40 to which the closing wheel 50 in the foreground is attached is positioned in the rearward-most lever notch 32, which correlates to the position of both levers 40 in FIGS. 3F and 3C. The lever 40 to which the closing wheel 50 in the background is attached is positioned in the forward-most lever notch 32, which correlates to the position of both levers 40 in FIGS. 3A, 3B, 3D and 3E. A comparison of FIGS. 3B and 3C, as well as a comparison of FIGS. 3E and 3F, show how the closing wheel assembly 10 allows the operator to compensate for changes in the orientation of the closing wheels 50 with respect to the ground surface, which changes in orientation may be caused by changing the angle of the closing wheel frame 30 with respect to the planter row unit 20.

Figure 2:
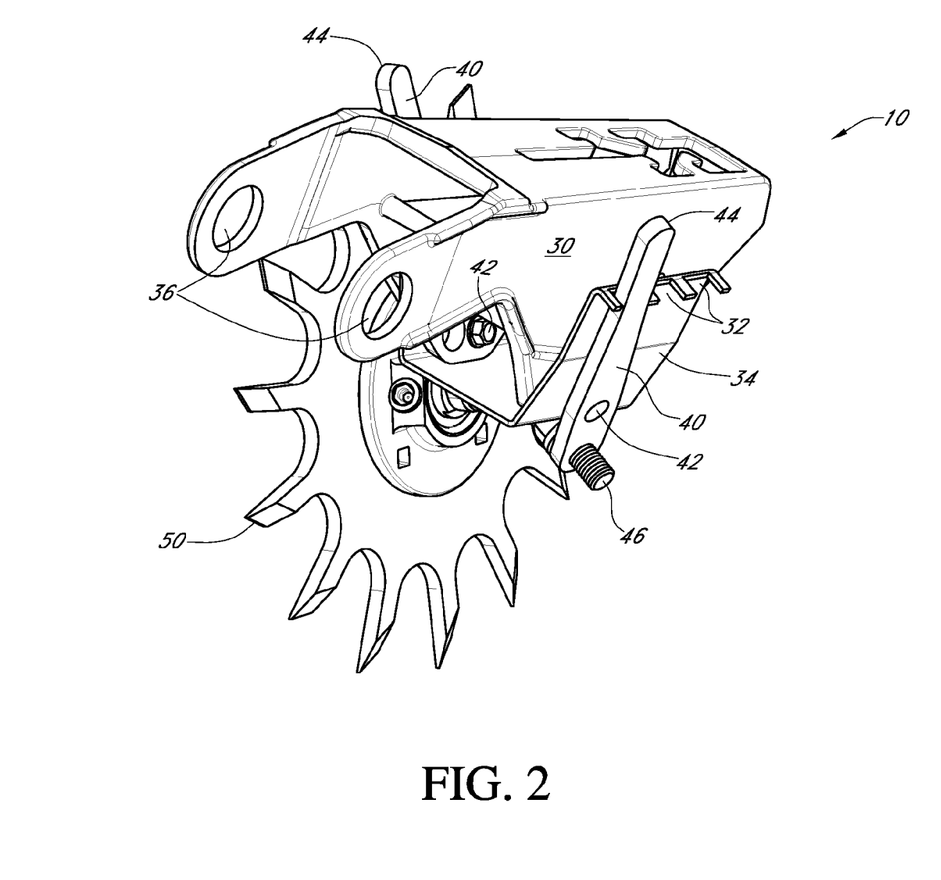
FIG. 2 provides a perspective view of one embodiment of the closing wheel assembly with one of the closing wheels removed.

FIG. 2 provides a front perspective view of the closing wheel assembly 10 with one of the closing wheels 50 removed for clarity. In the embodiment shown in FIGS. 1-4, the closing wheel assembly 10 is adapted to be mounted upon the closing wheel frame 30 disclosed in U.S. Pat. No. 5,676, 073. The second embodiment, shown in FIGS. 5-6, utilizes a novel closing wheel frame 30 that allows for adjustment of the orientation of the closing wheels 50 in a manner similar to the first embodiment, which will be described in detail below, but several elements of the closing wheel assembly 10 may be integrally formed in the second embodiment.

In the first embodiment shown in FIGS. 1-4, the closing wheel assembly 10 includes a lever notch bracket 34 that fits around a portion of the closing wheel frame 30. The lever notch bracket 34 may be mechanically affixed to the closing wheel frame 30 using bolts (not shown) and corresponding nuts (not shown) inserted through apertures 12 in the lever notch bracket 34 and the closing wheel frame 30. Other methods and/or structures may be used to affix the lever notch bracket 34 to the closing wheel frame 30 without departing from the spirit and scope of the closing wheel assembly 10 as disclosed and claimed herein. For example, the lever notch bracket 34 may be affixed to the closing wheel frame 30 using chemical adhesion, clamps, welding, etc.

The lever notch bracket 34 is generally U-shaped in the first embodiment as shown in FIGS. 3A and 3B. However, in other embodiments not pictured herein, the lever notch bracket 34 is V-shaped. In still other embodiments, such as those wherein the closing wheel assembly 10 is employed with only one closing wheel 50 mounted thereon, the lever notch bracket 34 is substantially planar or flat. Mounted to the closing wheel frame 30 and the lever notch bracket 34 are two levers 40; one on each side of the closing wheel frame 30. The levers 40 are pivotally mounted to the closing wheel frame 30 and lever notch bracket 34 at the lever attachment 42, which may also be a connecting point between the lever notch bracket 34 and the closing wheel frame 30. Accordingly, the levers 40 are rotatable with respect to both the lever notch bracket 34 and the closing wheel frame 30 about the lever attachment 42.

The closing wheel assembly 10 is shown in FIG. 2 with one of the closing wheels 50 removed for clarity. The first end of the lever 40 forms a lever handle 44 to provide a user interface. The second end of the lever 40 provides for a position on which to mount a closing wheel 50 referred to herein as a closing wheel mount 46. The closing wheel mount 46 may be formed as a hub that is pivotally engaged with the lever 40, or the closing wheel mount 46 may be formed as a hub that is pivotally engaged with the closing wheel 50. In other embodiments, the closing wheel mount 46 does not include a hub, but instead pivots with respect to an exposed bearing, journal bearing, or other type of pivotal mounting structure. Accordingly, the closing wheel assembly 10 is not limited by the type of closing wheel mount 46 used therewith, and any suitable closing wheel mount 46 may be used with the closing wheel assembly without departing from the spirit and scope thereof.

The closing wheel 50 may be angled with respect to the lever 40 in the vertical and/or horizontal planes to provide for the desired orientation of the closing wheels 50 with respect to the furrow. Alternatively, the closing wheel 50 may be substantially planar with respect to the lever 40, and the lever 40 may be angled with respect to the lever notch bracket 34 and/or closing wheel frame 30. Furthermore, the lever 40 may be angled about the lever attachment 42 so that the lever handle 44 and closing wheel mount 46 are angled with respect to one another, as shown in FIG. 2.

The lever notch bracket 34 is formed with a plurality of lever notches 32 on either side thereof. The notches 32 are sized to engage and secure the lever 40 in a certain position once the operator has placed the lever in that position. That is, the notches 32 secure the position of the lever 40 once set by the operator. As the lever 40 is moved from one notch 32 to the next, the lever 40 rotates with respect to the closing wheel frame 30 about the lever attachment 42. This rotation causes the orientation of the closing wheel 50 affixed to that lever 40 at the closing wheel mount 46 to change. Adjusting the orientation of the closing wheels 50 with respect to the closing wheel frame 30 allows the operator to compensate for the change in orientation of the closing wheels 50 with respect to the furrow caused by adjusting the penetration depth of the closing wheels 50 when pivoting the closing wheel frame 30 with respect to the row unit frame 27 about the closing wheel frame pivot 36. The spacing of the notches 32 may be configured so that the orientation difference of the closing wheel 50 when the lever 40 is moved from one notch 32 to an adjacent notch 32 compensates for the penetration depth change from one position of the closing wheel depth adjuster 38 to an adjacent position.

Accordingly, it will be apparent to those skilled in the art that the closing wheel assembly 10 as disclosed and claimed herein allows the operator to compensate for penetration depth changes of the closing wheels 50. That is, as the angle of the closing wheel frame 30 changes with respect to the ground surface, the angle at which the closing wheels 50 engage the ground surface will also change absent any compensation system (e.g., FIGS. 7A-7C). The closing wheel assembly 10 provides a compensation system that allows the operator to account for the angle change of the closing wheels 50 caused by adjusting the penetration depth thereof by changing the orientation of the closing wheels 50 with respect to the closing wheel frame 30. That is, the closing wheels 50 may be adjusted independently of the closing wheel frame 30 in the closing wheel assembly 10.

Figure 5:
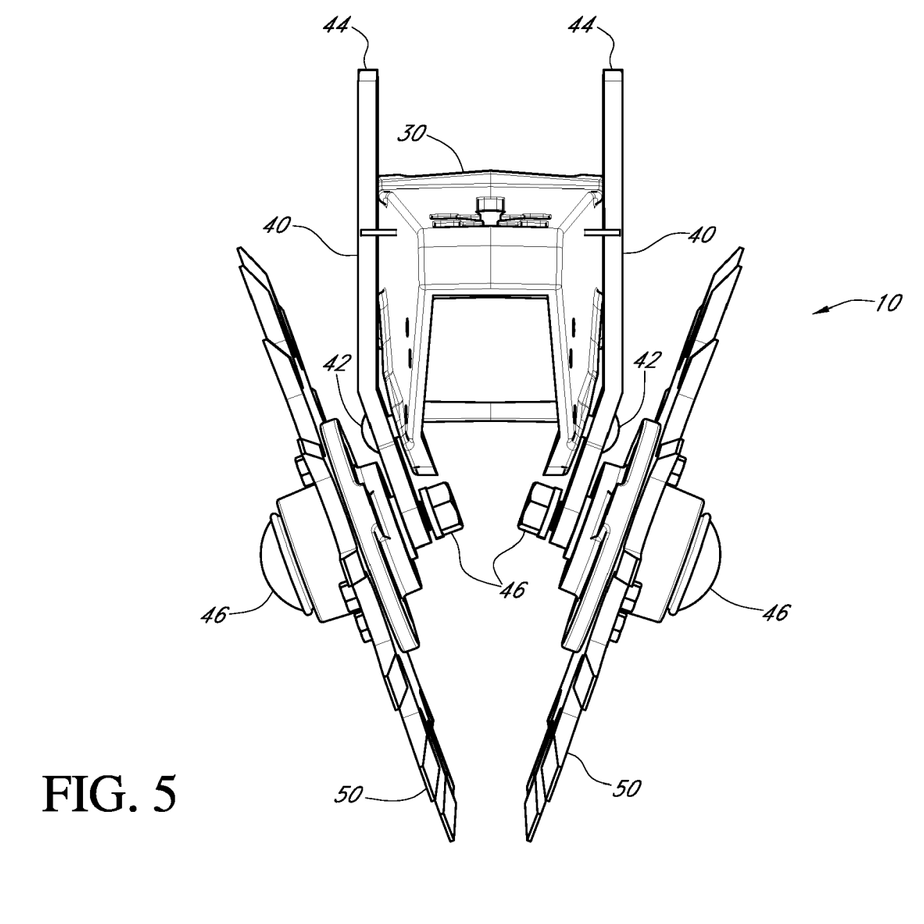
FIG. 5 provides a rear view of a second embodiment of the closing wheel assembly.

The embodiment shown in FIGS. 5 and 6 is substantially similar in operation to the embodiment shown in FIGS. 1-4. However, in the embodiment shown in FIGS. 5 and 6, a lever notch bracket 34 is not used. Instead, several components of the lever notch bracket 34 are integrated into the closing wheel frame 30. As may be seen in FIGS. 5 and 6, the lever notches 32 are integrated into the upper part of the closing wheel frame 30. The adjustment of the closing wheels 50 to compensate for different penetration depths of the closing wheels 50 is identical to that explained above for the embodiment shown in FIGS. 1-4. The embodiment shown in FIGS. 5 and 6 includes levers 40 that are substantially linear along the entire length thereof as opposed to the levers 40 shown in the first embodiment. However, any embodiment may have straight or angled levers 40, and the optimal angle and/or orientation of each lever 40 will depend on the specific type of closing wheel frame 30, planter row unit 20, and or closing wheel depth adjuster 38. In the first embodiment, the angle in the lever 40 is approximately one-hundred and forty-five degrees, but may be more or less in other embodiments.

In another embodiment of the closing wheel assembly 10 not pictured herein, the closing wheel assembly 10 is used with planter row units 20 having a single closing wheel 50 rather than paired closing wheels 50. In this embodiment, the closing wheel assembly 10 simply consists of a lever 40 mounted to the closing wheel frame 30, wherein the closing wheel frame 30 includes corresponding lever notches 32. As is apparent to those skilled in the art, the operation of an embodiment adapted for use with a single closing wheel 50 is substantially similar to the other embodiments pictured and described herein.

Depending on the specific application and/or operator preferences, difference angles of approach and orientations of the closing wheels 50 may be optimal for the conditions present. For example, in certain applications it may be that the most advantageous orientation of the closing wheels 50 is achieved through a non-symmetrical configuration of the closing wheels 50, such as that shown in FIG. 3G. However, for other applications it may be that a symmetrical application with a relatively narrow angle between the closing wheels 50 and the furrow is most advantageous, such as that shown in FIG. 3A. Accordingly, the resulting orientation of the closing wheels 50 with respect to the furrow, ground surface, closing wheel frame 30, row unit frame 27, or any other elements of the planter row unit 20 in no way limits the scope of the closing wheel assembly 10 as disclosed and claimed herein.

The closing wheel assembly 10 may be configured for use and operation adjacent a plurality of closing wheel assemblies 10 attached to a plurality of corresponding planter row units 20 attached to a tool bar 21 to form a contiguous planter unit (not shown). Furthermore, the closing wheel assembly 10 may be used with non-symmetrical closing wheels 50, or walking style closing wheels 50 that are offset with one another with respect to the direction of travel such as those disclosed in U.S. Pat. No. 6,530,334, which is incorporated by reference herein in its entirety.

It should be noted that the closing wheel assembly 10 is not limited to the specific embodiments pictured and described herein, but is intended to apply to all similar apparatuses for compensating for orientation changes in closing wheels 50 when the penetration depth of the closing wheels 50 is adjusted. Accordingly, modifications and alterations from the described embodiments will occur to those skilled in the art without departure from the spirit and scope of the closing wheel assembly 10.

What is claimed is:

1. A closing wheel assembly comprising:
   a. a closing wheel frame having first and second ends, wherein a plurality of lever notches are formed in said closing wheel frame;
   b. a closing wheel frame pivot adjacent said closing wheel frame first end, wherein said closing wheel frame is pivotally connected to a planter row unit frame about said closing wheel frame pivot;
   c. a closing wheel depth adjuster, wherein said closing wheel depth adjuster changes the vertical position of said closing wheel frame second end with respect to said closing wheel frame first end;
   d. at least one lever pivotally mounted to said closing wheel frame, wherein a first end of said lever forms a lever handle, wherein a second end of said lever forms a closing wheel mount, wherein said lever is fashioned to engage one said lever notch, and wherein said lever is pivotally mounted to said closing wheel frame at a lever attachment positioned between said first and second ends of said lever; and
   e. at least one closing wheel, wherein said at least one closing wheel is pivotally mounted to said closing wheel mount of said at least one lever.

2. The closing wheel assembly according to claim 1 wherein said closing wheel assembly is further defined as including one closing wheel.

3. The closing wheel assembly according to claim 1 wherein said plurality of lever notches is further defined as a first and second row of lever notches, wherein said first row is positioned on a first side of said closing wheel frame, and wherein said second row is positioned on a second side of said closing wheel frame.

4. The closing wheel assembly according to claim 3 wherein said closing wheel assembly is further defined as comprising a first and a second lever, wherein said first lever is pivotally mounted to a first side of said closing wheel frame about a first lever attachment, and wherein said second lever is pivotally mounted to a second side of said closing wheel frame about a second lever attachment.

5. The closing wheel assembly according to claim 4 wherein said closing wheel assembly is further defined as comprising a first and a second closing wheel, wherein said first closing wheel is pivotally mounted to a first closing wheel mount affixed to said first lever, and wherein said second closing wheel is pivotally mounted to a second closing wheel mount affixed to said second lever.

6. The closing wheel assembly according to claim 5 wherein each said row of lever notches is further defined as including three lever notches.

7. A closing wheel assembly comprising:
   a. a closing wheel frame having first and second ends;
   b. a lever notch bracket engaged with said closing wheel frame, wherein said lever notch bracket is formed with a plurality of lever notches;
   c. a closing wheel frame pivot adjacent said closing wheel frame first end, wherein said closing wheel frame is pivotally connected to a planter row unit frame about said closing wheel frame pivot;
   d. a closing wheel depth adjuster, wherein said closing wheel depth adjuster changes the vertical position of said closing wheel frame second end with respect to said closing wheel frame first end;
   e. at least one lever pivotally mounted to said closing wheel frame, wherein a first end of said lever forms a lever handle, wherein a second end of said lever forms a closing wheel mount, wherein said lever is fashioned to engage one said lever notch, and wherein said lever is pivotally mounted to said closing wheel frame at a lever attachment positioned between said first and second ends of said lever; and
   f. at least one closing wheel, wherein said at least one closing wheel is pivotally mounted to said closing wheel mount of said at least one lever.

8. The closing wheel assembly according to claim 7 wherein said closing wheel assembly is further defined as including one closing wheel.

9. The closing wheel assembly according to claim 8 wherein said lever notch bracket is further defined as being substantially planar in configuration.

10. The closing wheel assembly according to claim 7 wherein said plurality of lever notches is further defined as a first and second row of lever notches, wherein said first row is positioned on a first side of said lever notch bracket, and wherein said second row is positioned on a second side of said lever notch bracket.

11. The closing wheel assembly according to claim 10 wherein said closing wheel assembly is further defined as comprising a first and a second lever, wherein said first lever is pivotally mounted to a first side of said closing wheel frame about a first lever attachment, and wherein said second lever is pivotally mounted to a second side of said closing wheel frame about a second lever attachment.

12. The closing wheel assembly according to claim 11 wherein said closing wheel assembly is further defined as comprising a first and a second closing wheel, wherein said first closing wheel is pivotally mounted to a first closing wheel mount affixed to said first lever, and wherein said second closing wheel is pivotally mounted to a second closing wheel mount affixed to said second lever.

13. The closing wheel assembly according to claim 12 wherein each said row of lever notches is further defined as including three lever notches.

14. The closing wheel assembly according to claim 13 wherein said lever notch bracket is generally U-shaped.

15. A closing wheel assembly comprising:
   a. a closing wheel frame having first and second ends, wherein a plurality of lever notches are formed in said closing wheel frame;
   b. a closing wheel frame pivot adjacent said closing wheel frame first end, wherein said closing wheel frame is pivotally connected to a planter row unit frame about said closing wheel frame pivot;
   c. a closing wheel depth adjuster, wherein said closing wheel depth adjuster changes the vertical position of said closing wheel frame second end with respect to said closing wheel frame first end;
   d. a first lever having a first and a second end, wherein said first lever first end forms a lever handle, wherein said first lever second end includes a closing wheel mount, and wherein said first lever is pivotally mounted to a first side of said closing wheel frame about a first lever attachment;
   e. a second lever having a first and a second end, wherein said second lever first end forms a lever handle, wherein said second lever second end includes a closing wheel mount, and wherein said second lever is pivotally mounted to a second side of said closing wheel frame about a second lever attachment;
   f. a first closing wheel, wherein said first closing wheel is pivotally mounted to said first lever closing wheel mount; and
   g. a second closing wheel, wherein said second closing wheel is pivotally mounted to said second lever closing wheel mount.

* * * * *